US012365502B2

(12) United States Patent
Schmidt-Ellinger et al.

(10) Patent No.: US 12,365,502 B2
(45) **Date of Patent: *Jul. 22, 2025**

(54) STORAGE CONTAINER FOR AUTOMATED DISPENSING OF INDIVIDUAL MEDICAMENT PORTIONS

(71) Applicant: CareFusion Germany 326 GmbH, Kelberg (DE)

(72) Inventors: Hardy Schmidt-Ellinger, Gerolstein (DE); Dietmar Gross, Kelberg (DE)

(73) Assignee: CareFusion Germany 326 GmbH, Kelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,268

(22) Filed: Apr. 22, 2024

(65) Prior Publication Data

US 2024/0270422 A1 Aug. 15, 2024

Related U.S. Application Data

(63) Continuation of application No. 18/197,908, filed on May 16, 2023, now Pat. No. 12,012,243, which is a continuation of application No. 17/883,166, filed on Aug. 8, 2022, now Pat. No. 11,697,517, which is a continuation of application No. 17/238,867, filed on (Continued)

(51) Int. Cl.

| | |
|---|---|
| ***B65B 35/08*** | (2006.01) |
| ***A61J 1/03*** | (2023.01) |
| ***A61J 7/04*** | (2006.01) |
| ***B65D 25/14*** | (2006.01) |

(Continued)

(52) U.S. Cl.

CPC ................. *B65B 35/08* (2013.01); *A61J 1/03* (2013.01); *A61J 7/0454* (2015.05); *A61J 7/0481* (2013.01); *B65D 25/14* (2013.01); *B65D 83/0409* (2013.01); *G07F 17/0092* (2013.01)

(58) Field of Classification Search

CPC .. B65B 35/08; A61J 7/0454; A61J 1/03; A61J 7/0481

See application file for complete search history.

(56) References Cited

U.S. PATENT DOCUMENTS 229,543 A 7/1880 Maynard
4,273,254 A 6/1981 Cuppleditch et al.

(Continued)

FOREIGN PATENT DOCUMENTS

CN 204871749 U 12/2015
EP 887066 12/1998

(Continued)

OTHER PUBLICATIONS

Australian Notice of Allowance for Application No. 2015283080, dated May 2, 2019, 3 pages.

(Continued)

*Primary Examiner* — Gene O Crawford
*Assistant Examiner* — Ayodeji T Ojofeitimi

(57) ABSTRACT

Storage and dispensing devices are provided, which include a housing, a rotor disposed in the housing, a dispensing opening disposed in a bottom surface of the housing and configured to receive an individual medicament portion when a first channel of the rotor is aligned with the dispensing opening, and a recess disposed in the bottom surface of the housing and at least partially surrounding an axis of the rotor. Additional storage and dispensing devices are also provided.

18 Claims, 9 Drawing Sheets

Related U.S. Application Data

Apr. 23, 2021, now Pat. No. 11,472,585, which is a continuation of application No. 16/740,944, filed on Jan. 13, 2020, now Pat. No. 11,040,792, which is a continuation of application No. 16/294,629, filed on Mar. 6, 2019, now Pat. No. 10,532,840, which is a continuation of application No. 15/823,049, filed on Nov. 27, 2017, now Pat. No. 10,421,566, which is a continuation of application No. 14/323,970, filed on Jul. 3, 2014, now Pat. No. 9,828,168.

(51) Int. Cl.

| | |
|---|---|
| ***B65D 83/04*** | (2006.01) |
| ***G07F 17/00*** | (2006.01) |

(56) References Cited

U.S. PATENT DOCUMENTS

| | | | |
|---|---|---|---|
| 5,794,816 | A | 8/1998 | Pliler |
| 6,073,799 | A | 6/2000 | Yuyama |
| 6,256,963 | B1 | 7/2001 | Kim |
| 6,394,308 | B1 | 5/2002 | Yuyama et al. |
| 6,439,422 | B1 | 8/2002 | Papp et al. |
| 6,957,126 | B2 | 10/2005 | Kim |
| 7,048,141 | B2 | 5/2006 | Abdulhay |
| 7,395,946 | B2 | 7/2008 | Yuyama |
| 7,917,246 | B2 | 3/2011 | Handfield et al. |
| 8,833,602 | B1 | 9/2014 | Balasubramanian |
| 9,828,168 | B2 | 11/2017 | Schmidt-Ellinger |
| 10,532,840 | B2 | 1/2020 | Schmidt-Ellinger |
| 11,040,792 | B2 | 6/2021 | Schmidt-Ellinger |
| 11,472,585 | B2 | 10/2022 | Schmidt-Ellinger |
| 11,697,517 | B2 | 7/2023 | Schmidt-Ellinger |
| 2006/0058724 | A1 | 3/2006 | Handfield et al. |
| 2009/0133362 | A1 | 5/2009 | Bentele |
| 2010/0212776 | A1 | 8/2010 | Fay et al. |
| 2011/0192863 | A1 | 8/2011 | Barrass et al. |
| 2011/0301747 | A1 | 12/2011 | Chambers |
| 2011/0309101 | A1 | 12/2011 | Kokie |
| 2013/0233894 | A1 | 9/2013 | Kim |
| 2013/0240555 | A1 | 9/2013 | Kim |
| 2013/0292406 | A1 | 11/2013 | Kim |

FOREIGN PATENT DOCUMENTS

| | | | |
|---|---|---|---|
| JP | 2000203502 | A | 7/2000 |
| JP | 2005059903 | A | 3/2005 |
| JP | 2006306430 | | 11/2006 |
| JP | 2006306430 | A | 11/2006 |
| JP | 2006312475 | | 11/2006 |
| JP | 2007284087 | A | 11/2007 |
| JP | 2009526553 | A | 7/2009 |
| JP | 2010131233 | | 6/2010 |
| JP | 2010168110 | | 8/2010 |
| WO | WO-03096030 | | 11/2003 |
| WO | WO-2011082141 | | 7/2011 |
| WO | WO-2011130840 | A1 | 10/2011 |

OTHER PUBLICATIONS

Brazilian Office Action for Application No. BR112016030617-1, dated Jan. 22, 2020, 6 pages including machine translation.

Canadian Office Action for Application No. 2,953,650, dated May 19, 2021, 4 pages.

Canadian Office Action for Application No. 2,953,650, dated Nov. 2, 2021, 3 pages.

Chinese Office Action for Application No. 201510389010.3, Jul. 4, 2018, 9 pages.

Extended European Search Report for Application No. 14175587.6, dated Jan. 8, 2015, 11 pages including machine translation.

Indian Hearing Summons for Application No. 201627042450, dated Dec. 12, 2022, 2 pages.

Indian Office Action for Application No. 201627042450, dated Dec. 17, 2019, 7 pages.

International Search Report and Written Opinion for Application No. PCT/EP2015/063463, dated Aug. 19, 2015, 16 pages including English translation.

International Search Report and Written Opinion for Application No. PCT/EP2015/065037, dated Oct. 14, 2015, 12 pages. cited by applicant.

Japanese Notice of Allowance for Application No. 2019-237783, dated Aug. 10, 2021, 4 pages including translation.

Japanese Office Action for Application No. 2017-519799, dated Aug. 27, 2019, 4 pages including translation.

Japanese Office Action for Application No. 2017-519799, dated Mar. 5, 2019, 8 pages including translation.

Japanese Office Action for Application No. 2019-237783, dated Apr. 13, 2021, 4 pages including translation.

Japanese Office Action for Application No. 2019-237783, dated Dec. 15, 2020, 8 pages including translation.

Korean Notice of Allowance for Application No. 10-2017-7000470, dated Jun. 28, 2022, 5 pages including translation.

Korean Office Action for Application No. 10-2017-7000470, dated Dec. 8, 2021, 4 pages including translation.

Mexican Notice of Allowance for Application No. MX/a/2016/016772, dated Apr. 9, 2018, 4 pages including machine translation.

United Arab Emirates Office Action for Application No. UAE/P/6000406/2016, dated Mar. 24, 2020, 8 pages.

STORAGE CONTAINER FOR AUTOMATED DISPENSING OF INDIVIDUAL MEDICAMENT PORTIONS

CROSS-REFERENCE TO RELATED APPLICATIONS

This Application is a continuation of U.S. patent application Ser. No. 18/197,908, entitled "STORAGE CONTAINER FOR AUTOMATED DISPENSING OF INDIVIDUAL MEDICAMENT PORTIONS," filed May 16, 2023, issued as U.S. Pat. No. 12,012,243 on Jun. 18, 2024, which is a continuation of U.S. patent application Ser. No. 17/883,166, entitled "STORAGE CONTAINER FOR AUTOMATED DISPENSING OF INDIVIDUAL MEDICAMENT PORTIONS," filed Aug. 8, 2022, issued as U.S. Pat. No. 11,697,517 on Jul. 11, 2023, which is a continuation of U.S. patent application Ser. No. 17/238,867, entitled "STORAGE CONTAINER FOR AUTOMATED DISPENSING OF INDIVIDUAL MEDICAMENT PORTIONS," filed Apr. 23, 2021, issued as U.S. Pat. No. 11,472,585 on Oct. 18, 2022, which is a continuation of U.S. patent application Ser. No. 16/740,944, entitled "STORAGE CONTAINER FOR AUTOMATED DISPENSING OF INDIVIDUAL MEDICAMENT PORTIONS," filed Jan. 13, 2020, issued as U.S. Pat. No. 11,040,792 on Jun. 22, 2021, which is a continuation of U.S. patent application Ser. No. 16/294,629 entitled "STORAGE CONTAINER FOR AUTOMATED DISPENSING OF INDIVIDUAL MEDICAMENT PORTIONS," filed on Mar. 6, 2019, issued as U.S. Pat. No. 10,532,840 on Jan. 14, 2020, which is a continuation of U.S. patent application Ser. No. 15/823,049 entitled "STORAGE CONTAINER FOR AUTOMATED DISPENSING OF INDIVIDUAL MEDICAMENT PORTIONS," filed on Nov. 27, 2017, issued as U.S. Pat. No. 10,421,566 on Sep. 24, 2019, which is a continuation of U.S. patent application Ser. No. 14/323,970 entitled "STORAGE CONTAINER FOR AUTOMATED DISPENSING OF INDIVIDUAL MEDICAMENT PORTIONS," filed on Jul. 3, 2014, issued as U.S. Pat. No. 9,828,168 on Nov. 28, 2017, the disclosures of which are hereby incorporated by reference in their entirety for all purposes.

BACKGROUND

The present disclosure relates to a storage container for individual medicament portions and in particular to a storage container for an apparatus for automated dispensing of individual medicament portions.

In many medical treatment settings, it is desirable to provide individual medicament portions, or medicine, to patients on an individual basis. In some instances, groups of common drugs can be packaged together in a container, based on a physician's prescription, for a patient. This permits patients to have an individual package or container with their medications based on their individual needs. It also permits caregivers to provide patients with a single group of medicament portions. Packaged medications can reduce the likelihood of mistakes by the caregiver and increase efficiency of the caregiver.

SUMMARY

Apparatuses for automated dispensing of individual medicament portions, for example individual pills of a drug, are used in blister packaging machines in hospitals and blister centers. These packaging machines provide blister medicament portions according to the intake times and combinations directed by a physician. Blister packaging machines can contribute to optimization of medicament management and drug logistics. With the help of some blister packaging machines, the individual medicament portions can be blistered within a short amount of time (relative to other methods of combining medicament portions), according to specific patients, and with a very small number of operators.

The different medicament portions blistered with the blister packaging machines may be stored in a plurality of apparatuses for automated dispensing of individual medicament portions, whereby an individual blister packaging machine can include several hundred such apparatuses depending on the requirements of the installation site.

It is desirable to avoid contamination of the blistered packaging machines and the storage apparatuses with medicament portions and other particles that are not included in the medicament management and drug logistics.

One or more embodiments provide a storage and dispensing device, comprising: a housing; a rotor disposed in the housing; a dispensing opening disposed in a bottom surface of the housing and configured to receive an individual medicament portion when a first channel of the rotor is aligned with the dispensing opening; and a recess disposed in the bottom surface of the housing and at least partially surrounding an axis of the rotor.

One or more embodiments provide a storage and dispensing device, the device comprising: a housing; a rotor disposed in the housing; a dispensing opening disposed in a bottom surface of the housing and configured to receive an individual medicament portion when a first channel of the rotor is aligned with the dispensing opening; a recess disposed in the bottom surface of the housing; at least one cleaning agent disposed on the rotor and configured to move contamination particles to the recess when the rotor turns; and a gap between a bottom of the rotor and the bottom surface.

One or more embodiments provide a storage and dispensing device, comprising: a housing; a rotor disposed in the housing; a dispensing opening disposed in a bottom surface of the housing and configured to receive an individual medicament portion when a first channel of the rotor is aligned with the dispensing opening; and a recess disposed in the bottom surface of the housing. The dispensing device further comprises one of a stop element comprising an elastic arm configured to engage with a toothed profile formed in an axis of the rotor and to avoid an unintended rotation of the rotor; and a vibration device mechanically coupled to a contact area adjacent to the bottom surface, the vibration device configured to expose the housing to a vibration.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

DETAILED DESCRIPTION

Figure 1A:
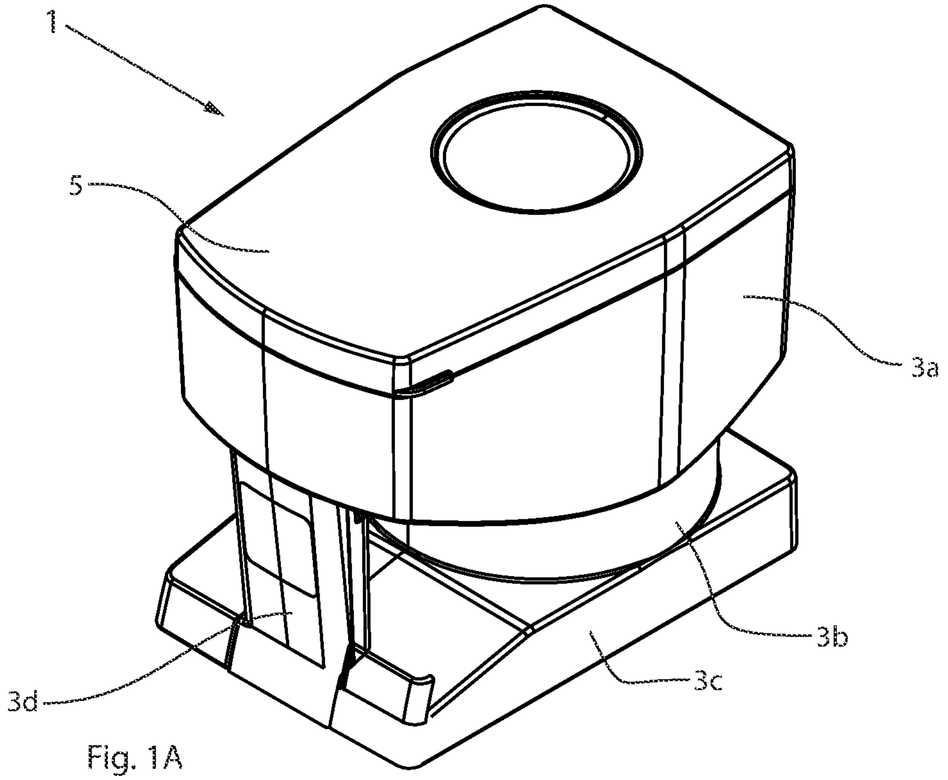
FIG. 1A shows a perspective view of a storage container, according to some embodiments.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Apparatuses for automated dispensing of individual medicament portions may include two main components, which are a storage container to store the individual medicament portions, whereby such storage container may include at least a portion of a separation device required for dispensing individual medicament portions, and a container intake, on which the container is mounted. Such container intake can also include parts of the separation device (for example, the motor and/or a control device). Generally, the two main components of the device for dispensing individual medicament portions are separate components; it is, however, also possible to implement the apparatus in one piece.

The apparatus for dispensing individual medicament portions is generally attached via the container intake to a blister packaging machine. If the storage container has to be refilled or medicaments are to be exchanged in the storage container, the storage container may be generally removed from the container intake and new medicaments are filled at a filling station.

During filling of the medicament portions into a receiving space of the storage container as well as during separation itself, it is possible that small particles chip off the individual medicament portions and settle as undesired contamination particles in the storage container together with other carried-in or occurring contamination, or are carried out during dispensing.

Contamination particles can impair the mechanics within the storage container and settle therein. This is particularly the case during a change of the type of medicament portions in a storage container, some embodiments ensure that such container is cleaned, thus avoiding carrying out medicament residues of a medicament previously stored in the storage container via the separation device from the storage container for a different, subsequently stored medicament, and, in extreme cases, be blistered, as well.

The formation of contamination particles in the storage container is a common occurrence, particularly for such medicaments which are frequently requested. Carrying-in of contamination particles during refilling of medicament portions is generally common, as well.

Embodiments herein provide storage containers for an apparatus for automated dispensing of individual medicament portions whereby the exposure to contamination particles is reduced.

The storage container according to the disclosure includes a housing, which encloses a receiving space, and having a bottom surface, whereby the individual medicament portions are stored in the receiving space. A separation device is arranged on the bottom surface with at least one channel to accept at least one medicament portion, whereby the at least one channel has an opening facing the receiving space and an opening facing the bottom surface, whereby a contact area is associated with the opening facing the bottom surface, over which the medicament portions are guided upon a movement of the separation device.

The separation device in the storage container can include components, used for the separation of medicament portions stored in the receiving space. Depending on the exact configuration of the storage container and a container intake carrying the storage container, the separation device of the storage container according to the disclosure can also include just one part of the components of the separation device, whereby other parts (for example the drive and a control) are arranged in the container intake. Within this application, the term separation device includes "complete" separation devices as well as just partial separation devices, which are such separation devices, which do not include all the required parts for a separation.

The storage container according to the disclosure further includes at least one recess arranged in the bottom surface outside of the contact surface to receive contamination particles present in the container.

During separation, the medicament portions reach the channel via the opening facing the receiving space and further through the channel to the opening of the channel facing the bottom surface, where they rest on the bottom surface in the contact area. If an individual medicament portion is requested, the medicament portion, which is arranged in the channel at the opening facing the bottom surface and resting on the contact area of the bottom surface, is led by the separation device towards an opening (which can also be part of the separation device) via the contact area in the housing (e.g. the bottom surface), via which the medicament portions leave the storage container.

Contamination particles form during filling of the receiving space with individual medicament portions, and on the other hand, during separation itself, if, for example, an individual medicament portion hits the contact area of the bottom surface during separation or is guided along the same.

During operation of the blister packaging machine, particularly during separation, the storage container is constantly exposed to minor vibrations, which ensure that the contamination particles are constantly moved on the bottom surface. With the vibration-induced movement of the contamination particles, these reach the at least one recess in the bottom surface, in which they are retained. With the help of the recess, it is therefore ensured that contamination particles, which form during operation, are "caught." The contamination particles retained in the recess, are not dispensed and do not impair the mechanics. Thus, general exposure to contamination particles is substantially reduced.

The separation device can operate according to principles known to a person skilled in the art and be constructed accordingly. Thus, it is conceivable, for example, that the separation device may have one channel to receive an individual medicament portion, whereby the channel is movable to a receiving position, in which the opening of the channel facing the bottom surface is cleared, and is movable into a dispense position, in which the opening of the channel facing the receiving space is closed and the opening facing the bottom surface is opened towards a dispensing opening in the housing/bottom surface.

A separation device constructed accordingly is kept very simple from the point of view of construction. In some embodiments, a desired dispensing speed of individual medicament portions may be achieved by including a rotor arranged on the bottom surface with a plurality of channels, in the separation device. The rotor is arranged in such way that a gap is provided between the bottom of the rotor and the bottom surface, through which gap contamination particles can pass. Due to the plurality of channels in the rotor, individual medicament portions may be arranged in several channels, and dispensing an individual medicament portion can be achieved by turning the rotor by a selected angle into a dispense position in which an individual medicament portion is dispensed from a respective channel via a dispensing opening in the housing.

The arrangement of the channels in the rotor depends on the exact constructive design of the separation device. In some embodiments, the channels are arranged at the outer circumference of the rotor and are open outwardly, i.e., the channels are formed by a plurality of webs at the circumference of the rotor. In such case, the housing is then fitted to the rotor in such a way that a specific section of the housing is formed to accept the rotor and has a corresponding circular cylindrical section, the diameter of which is slightly larger than the outer diameter of the rotor. Correspondingly arranged channels can be cleaned more easily. Further, access of medicament portions into the channels is simplified by a corresponding formation of the upper side of the rotor.

As indicated further above, contamination particles can be moved to the at least one recess in the bottom surface by vibrations of the storage container. To support or guide such movement in the direction of the at least one recess and to ensure that a larger amount of contamination particles is moved faster to the at least one recess, one embodiment is provided with at least one section of the bottom surface being funnel-shaped. In such a configuration, the rotor of the separation device is arranged in the center of the funnel-shaped section and the at least one recess formed in the bottom surface is arranged between the center of the funnel-shaped section and the contact area. For these embodiments, the at least one recess is thus formed within the circular contact area so that contamination particles are moved or guided by the vibration of the storage container and by gravity, induced due to the inclination of the funnel-shaped section of the at least one recess.

To be able to accept as many contamination particles as possible with a large area of the bottom surface, some embodiments are provided with the at least one recess being formed as coaxial groove with respect to the rotor axis. In doing so, the exact design of the recess or the recesses depends on the specific construction of the separation device. For example, the recess can be formed circular, i.e., a recess formed as a groove surrounds the entire center of the funnel-shaped section, ensuring that as many contamination particles as possible are accepted. In some embodiments of the separation device, the recess is formed as a circular section, and an angular range remains clear, or interrupts the circular section of the recess, where no recess is arranged.

To further support the movement of the contamination particles towards the at least one recess, one embodiment of the disclosure is provided with a plurality of cleaning agents at the bottom side of the rotor facing the bottom surface, which feeds the contamination particles to the at least one recess. Such cleaning agents can be formed as small brushes, for example, which are formed depending on the direction of rotation of the rotor at the bottom side of the rotor.

Provided that the storage container according to the disclosure has a separation device including a rotor, the rotor can be mounted on a rotor axis permeating the bottom surface. To prevent contamination particles reaching the axis area and cause a mechanical malfunction, one embodiment includes a circular protrusion on the bottom surface, which is formed coaxially with respect to the rotor. Thus, the at least one recess is arranged outside the bottom surface, which is enclosed by the protrusion.

To further accelerate the movement of the contamination particles on the bottom surface towards the recess and to prevent a settling of the contamination particles on the bottom surface itself, one embodiment of the storage container according to the disclosure includes at least one section of the bottom surface being coated with a non-stick coating.

As mentioned, contamination particles reach the at least one recess due to the vibration occurring during operation, among others. To actively support the operation, for example, when the blister packaging machine does not actively blister, one embodiment includes a vibration device in the storage container. The vibration device exposes the storage container to vibration to actively move the contamination particles during operation toward the at least one recess.

FIG. 1A shows a perspective view of an embodiment of the storage container 1 according to the disclosure for an apparatus for automated dispensing of individual medicament portions. The shown storage container is part of the previously mentioned apparatus, which includes a container intake as a further main component.

The storage container 1 can include a housing with several housing sections, an upper storage section 3*a*, a middle circular cylindrical section 3*b* to accept a portion of the separation device, a lower bottom section 3*c*, and a handle section 3*d*. For the embodiments shown, the upper section 3*a* is closed with a lid 5.

Figure 1B:
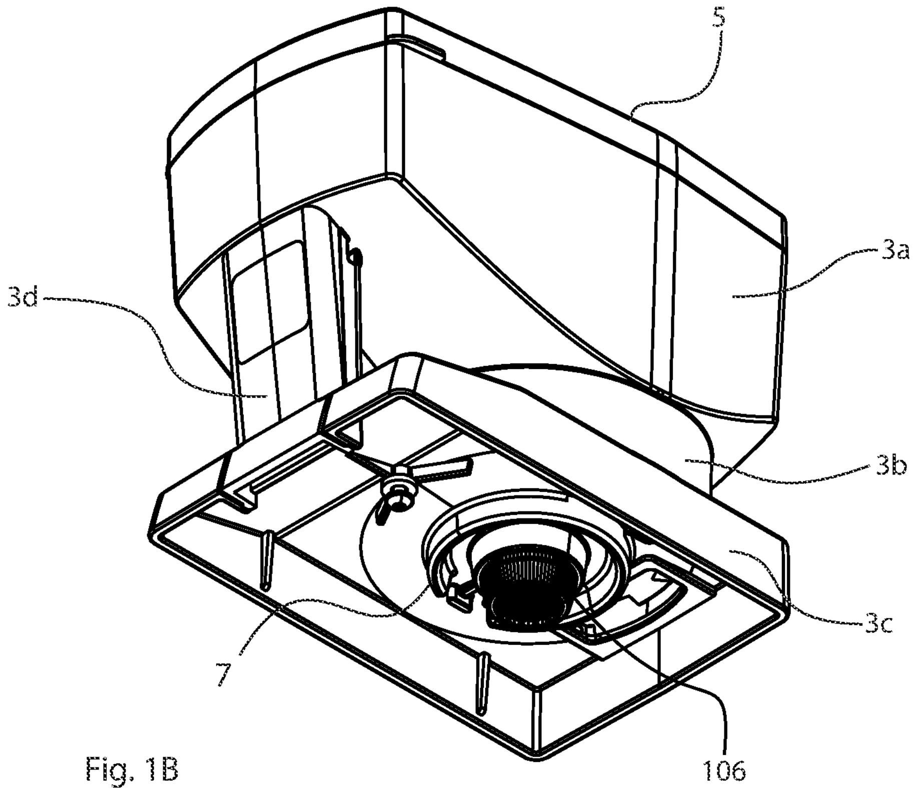
FIG. 1B shows a second perspective view of the storage container, according to some embodiments.

It can be discerned in the perspective view from below according to FIG. 1B, that an axis 106 is arranged in the lower housing section 3*c*, which is guided through an opening into a bottom surface 4 of the housing. Coaxially to axis 106, a protrusion 7 is arranged along a circular arc. Viewing the storage container from above, this "protrusion" is depicted as recess 7 in the bottom surface 4.

Figure 2:
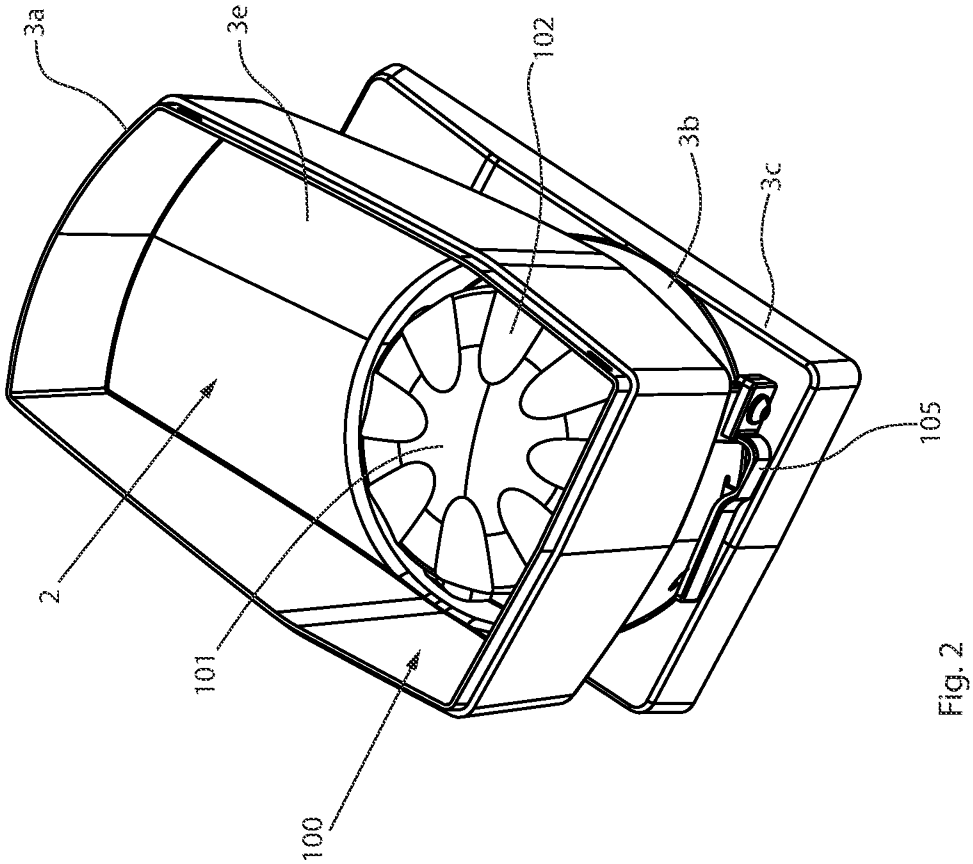
FIG. 2 shows a further perspective view of the storage container, according to some embodiments.

FIG. 2 shows another perspective view of the embodiment, whereby this representation omits the lid for a better view into the storage container.

In this representation, a rotor 101 can be discerned in the circular cylindrical section 3*b* of the housing, which is part of the separation device 100. Rotor 101 includes (see particularly FIG. 9B) a plurality of channels 102, which are arranged outwardly open at the circumference of the rotor by webs 108 and separated from another, and having an upper opening 103 and a lower opening 104. The rotor 101 is, as discernible from FIG. 9B, mounted on a rotor axis 106, which extends through the bottom surface 104 (see FIG. 1B).

The perspective view shown in FIG. 2 further shows another housing section 3*e*, which is formed tilted towards rotor 101. Housing sections 3*a* and 3*e* as well as rotor 101 define a receiving space 2, in which individual medicament portions are stored in the operating condition.

Figure 3:
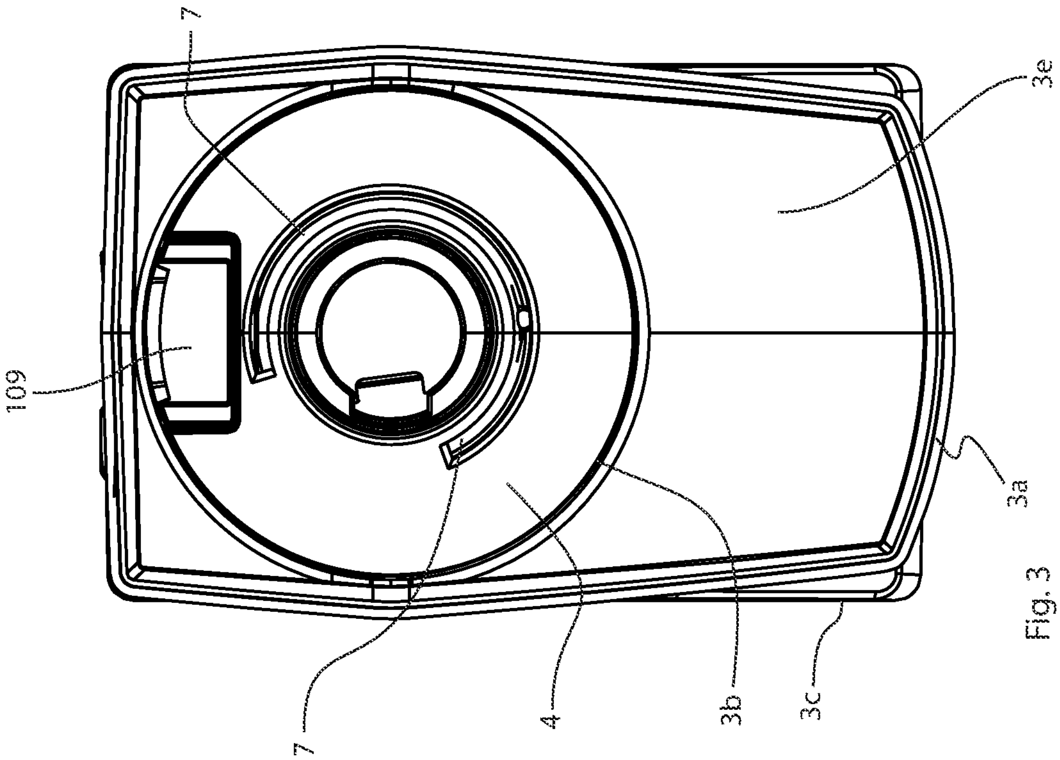
FIG. 3 shows a top view onto the housing, according to some embodiments.

FIG. 3 shows a top view onto the housing of the first embodiment of the storage container according to the disclosure, whereby parts of the separation device 100 were omitted from this view, the rotor 101 and the rotor axis 106, among others. It can be discerned in FIG. 3 that the circular cylindrical section 3*b* of the housing includes a bottom surface 4 with a central rotor axis opening and a medicament dispensing opening 109. Recess 7 can also be discerned in the bottom surface, which is groove-shaped and coaxially formed with respect to the rotor axis opening.

Figure 4:
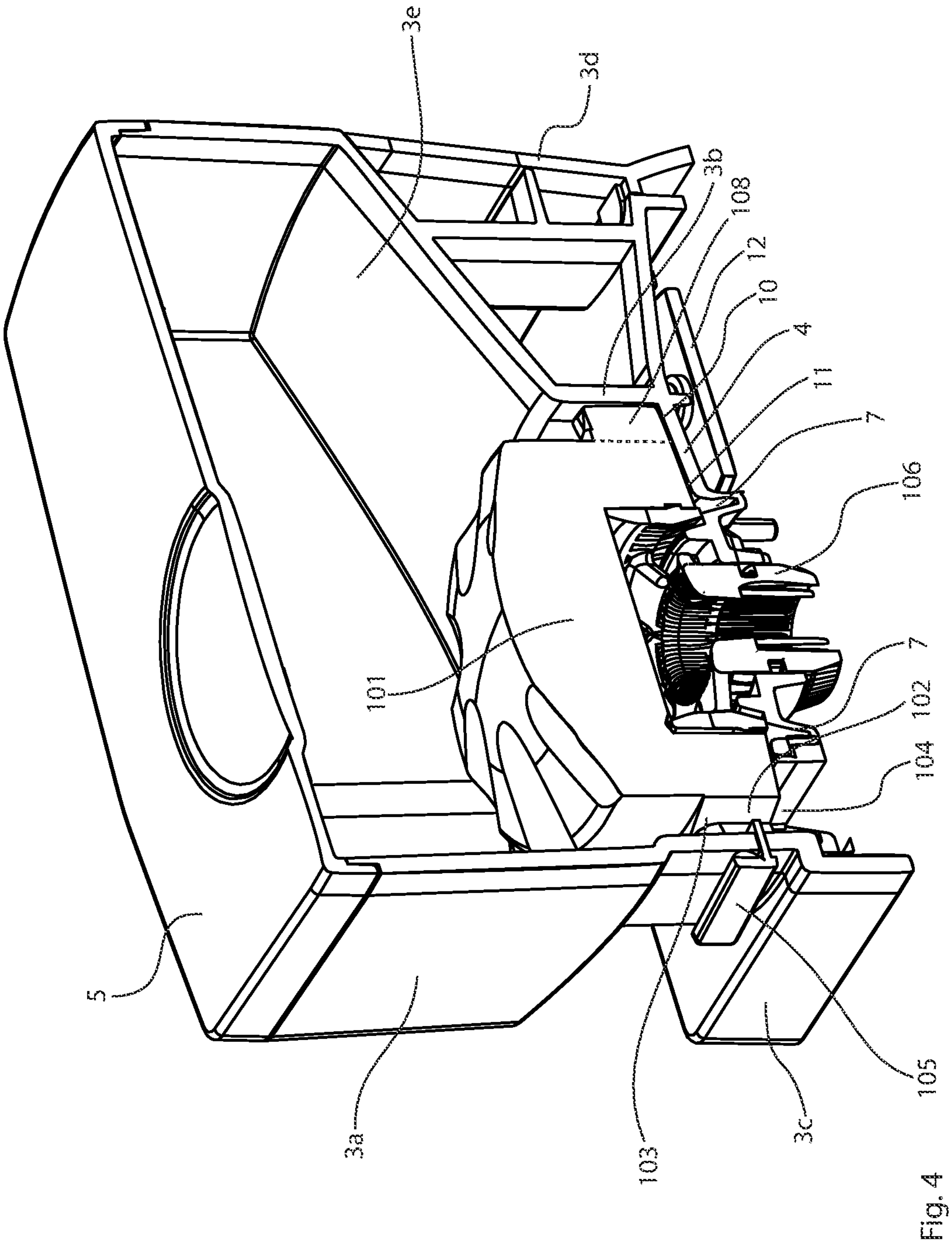
FIGS. 4, 5, and 6 show section views of the storage container, according to some embodiments.

FIG. 4 shows a sectional view of the embodiment of the storage container according to the disclosure. In FIG. 4, the housing section 3*e* can be discerned, which is tilted towards rotor 101. Bottom surface 4 aligns with the circular cylindrical housing section 3*b* towards the bottom, which bottom surface is formed funnel-shaped towards the rotor axis opening, for the embodiment shown. Rotor 101 and rotor axis 106 are arranged such that a gap 11 is formed between the bottom of the rotor and the upper side of bottom surface 4, through which gap contamination particles can move towards recess 7, whereby the recess is formed coaxially with respect to the rotor axis opening in the funnel-shaped bottom surface 4 as a circumferential groove.

On the left side of rotor 101, a "cut" is illustrated by a channel, on the right side of a web 108. At channel 102, opening 103, which is facing the receiving space 2, and opening 104, which is facing the bottom surface, can be discerned, whereby opening 104 aligns with an opening 109 in the bottom surface 4. The position of rotor 101 shown in FIG. 4 illustrates the dispensing position, i.e., in this position an individual medicament portion is fed via a correspondingly aligned channel to opening 109, via which it exits the apparatus for automated dispensing of individual medicament portions.

It can be discerned at the web, which is cut on the right side, that the web area strokes over a section of bottom surface 4, which is exposed in the area of the channels. With respect to random positions of rotor 101 this results in a circular area at the outer bottom surface 4 for the embodiment of the rotor shown, which area may be continuous except for opening 109. Via such contact area 10 medicament portions lying in the channels are moved towards opening 109 (for separation). During such movement the smallest amounts of medicament particles can chip off of the individual medicament portions and contribute to contamination of the storage container. Such contamination particles move to recess 7 due to the constant vibration of the storage container alone, and are retained therein. The bottom surface, however, is formed funnel-shaped for the embodiment shown, whereby such formation of the bottom surface contributes to the fact that contamination particles reach recess 7 (gravity-induced).

On the left side, a retention component 105 is shown, whereby a section of such retention component penetrates an opening 6 in the housing and partially engages in the channel aligned with opening 109. In doing so, it is prevented that another medicament portion slides down from above and is also dispensed, at the very moment an individual medicament portion is dispensed via opening 109. It follows that in case two medicament portions are to be dispensed two rotation steps of the rotor may be performed.

Below the contact area 10, a vibration device 12 is arranged at the housing. Vibration device 12 moves contamination particles to recess 7 by exposing the housing to vibration.

Figure 5:
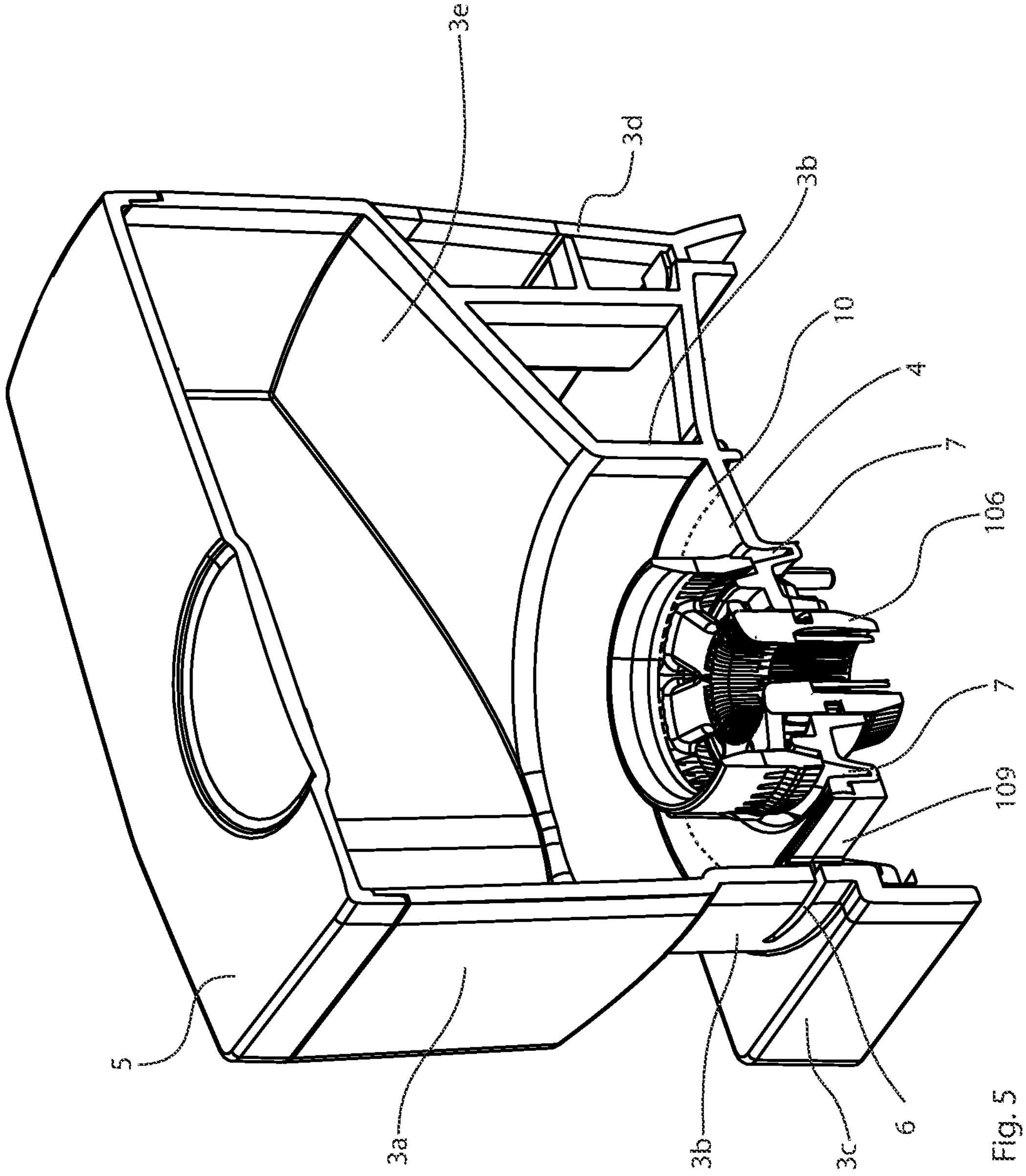

FIG. 5 shows a further sectional view of the embodiment of the storage container according to the disclosure, whereby the rotor was omitted for illustration purposes. FIG. 5 illustrates the circular contact area 10 on the bottom surface. FIG. 5 also illustrates opening 6 in the housing section 3*b*.

Figure 6:
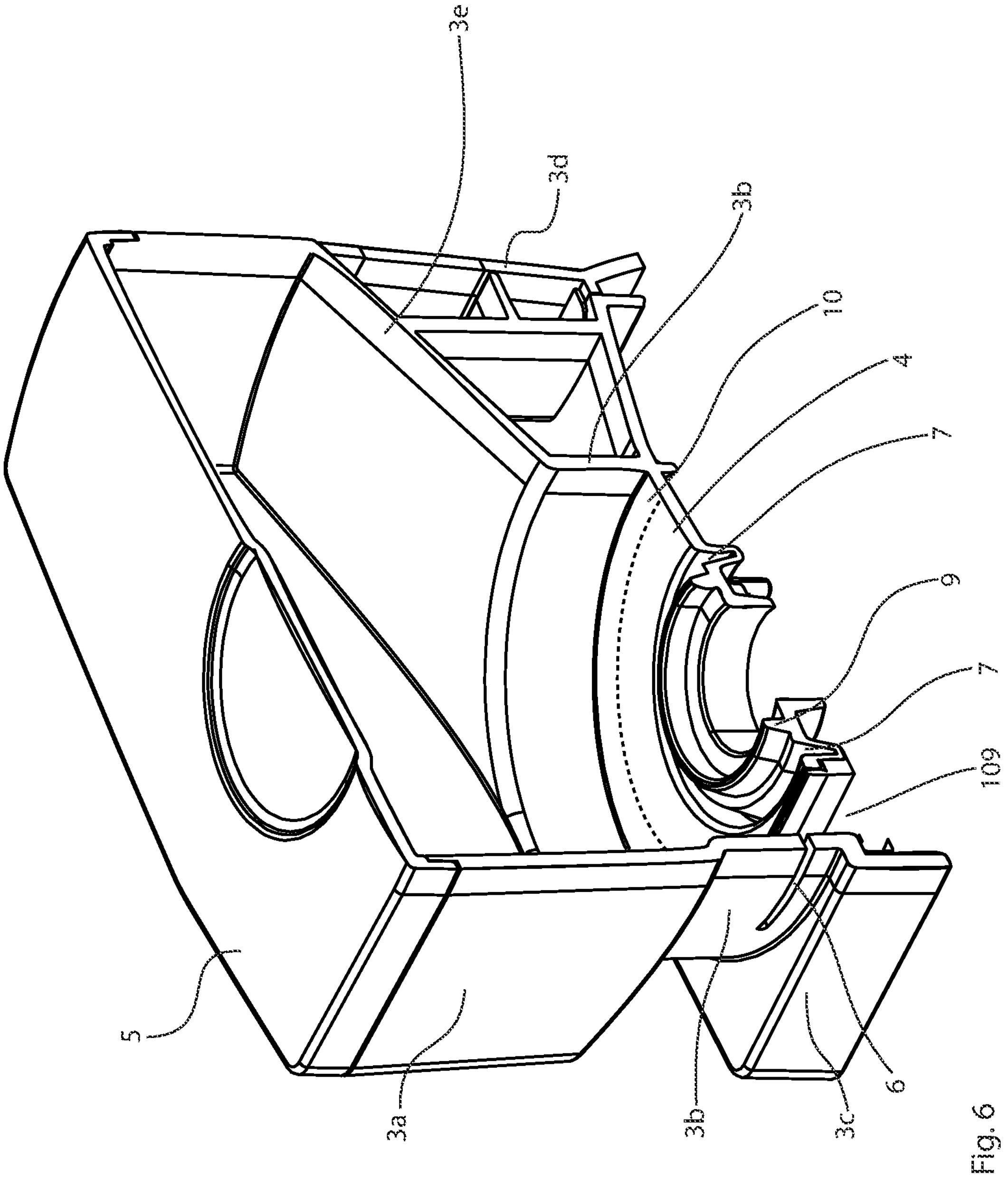

For the sectional view shown in FIG. 6, rotor axis 106 has also been omitted and it can be discerned that a protrusion 9 is formed coaxially with respect to the central rotor axis opening in bottom surface 4, i.e., between the rotor axis opening and recess 7. With such protrusion 9 it can be prevented that, if contamination particles should get above the recess, such particles reach the mechanically sensitive area at rotor axis 106.

Figure 7:
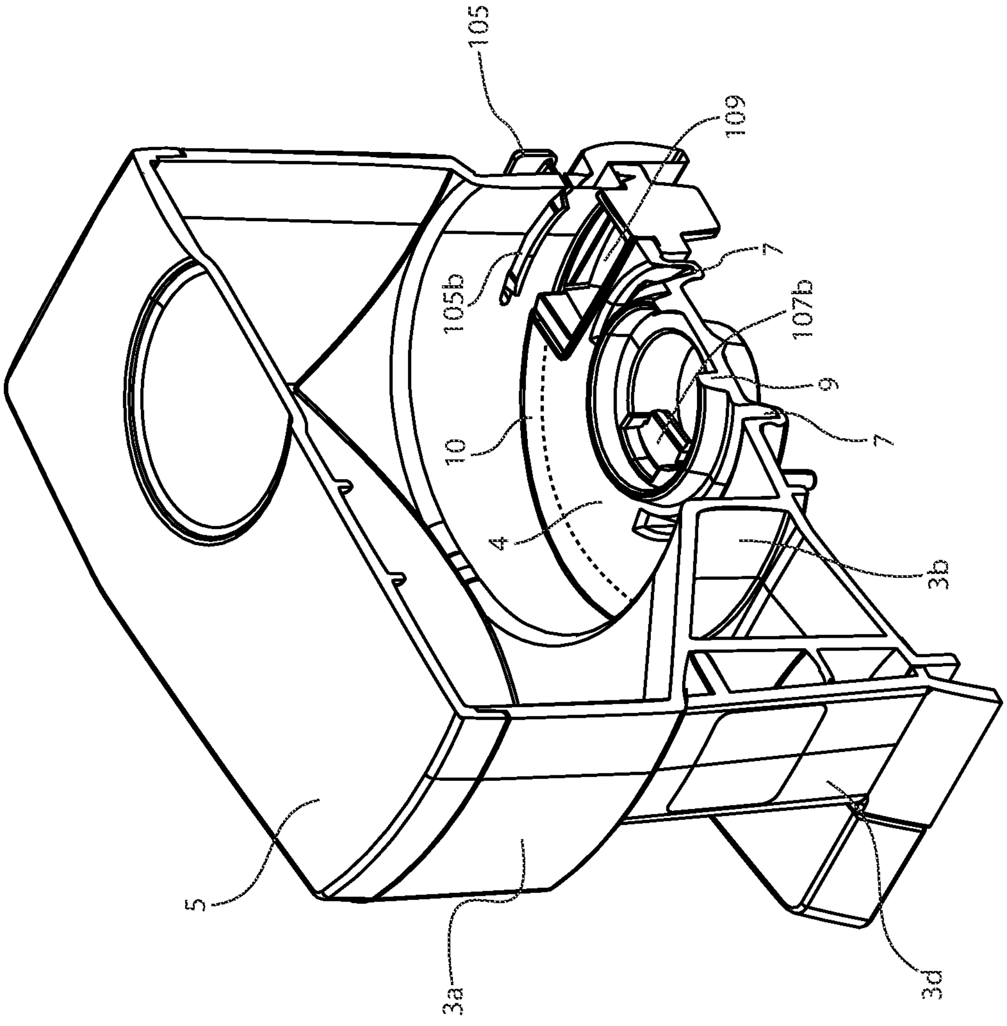
FIG. 7 shows a further section view, whereby such view is rotated by 180° with respect to FIG. 6, according to some embodiments.

FIG. 7 shows the illustration shown in FIG. 6 rotated by 180° and this view shows the section 105*b* of the retention component 105 engaging with a channel. Section 105*b* engaging with the channel is either formed elastically so that it is deformed by a web (e.g., brush-type formation of the engaging section 105*b*), or retention component 105 includes an elastic section so that section 105*b*, which is engaging with the channel, can be pressed out from the channel during movement of the rotor.

As can be seen from FIG. 7, recess 7, which is coaxial with respect to the central opening in the bottom surface, is not completely circular, i.e., formed without interruption; rather, a part of bottom surface 4 has no recess. The reason for this is that a stop mechanism 107 is formed for such area, which is engaging with the rotor axis 106. FIG. 7 shows a stop element 107 from such mechanism, which engages with that area where the rotor axis is typically arranged.

Figure 8:
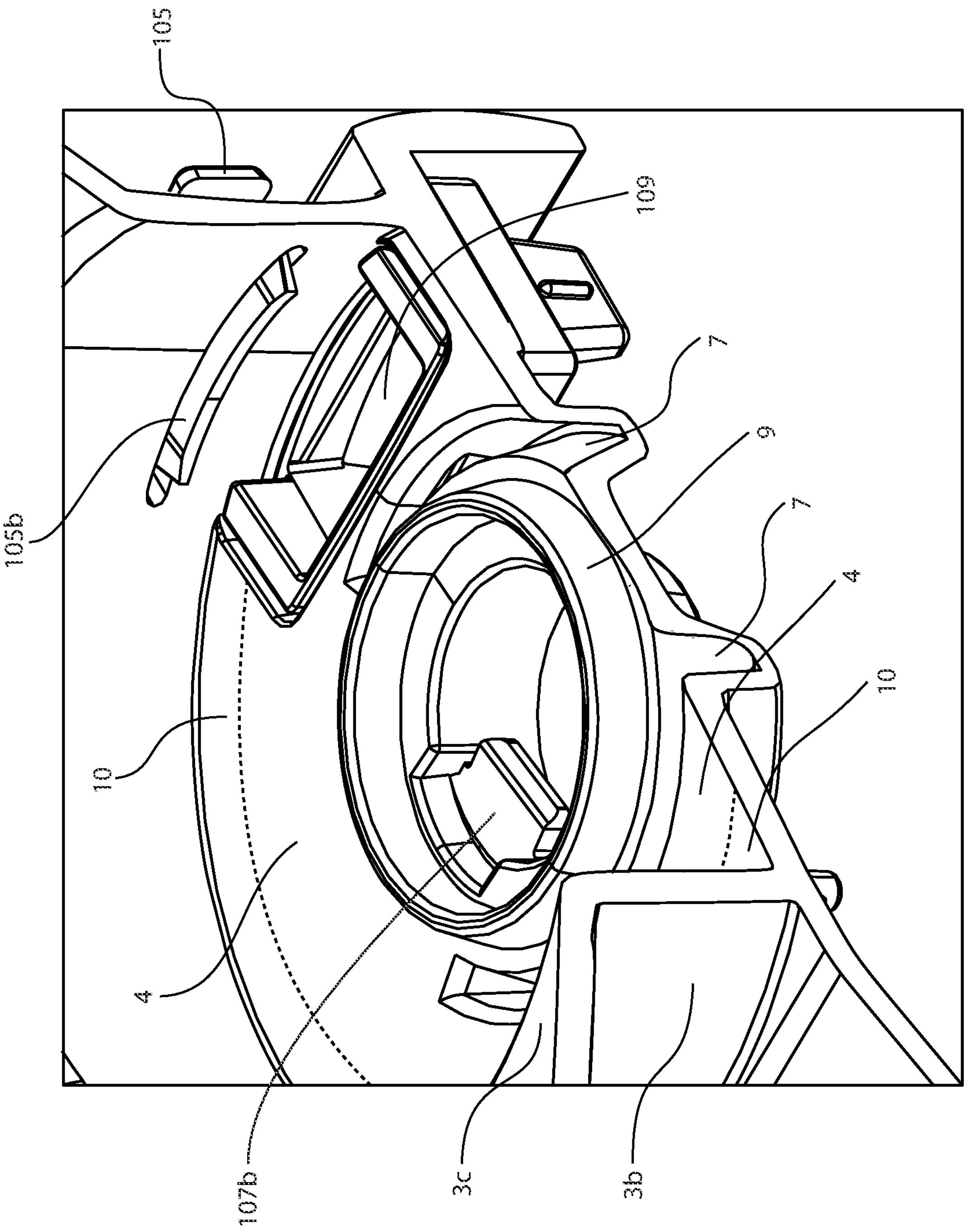
FIG. 8 shows an enlargement of a section of FIG. 7, according to some embodiments.

FIG. 8 illustrates the previously mentioned details in a sectional enlargement.

Figure 9A:
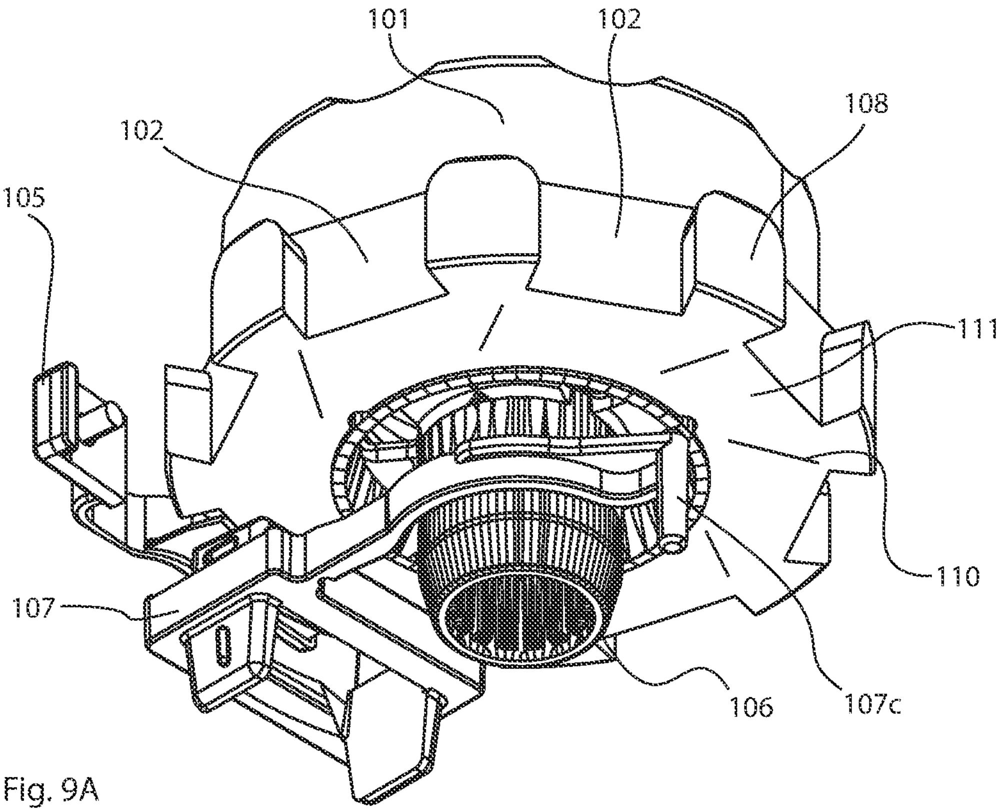
FIGS. 9A and 9B show detailed views of a part of the separation device and components engaging therewith, according to some embodiments.
Figure 9B:
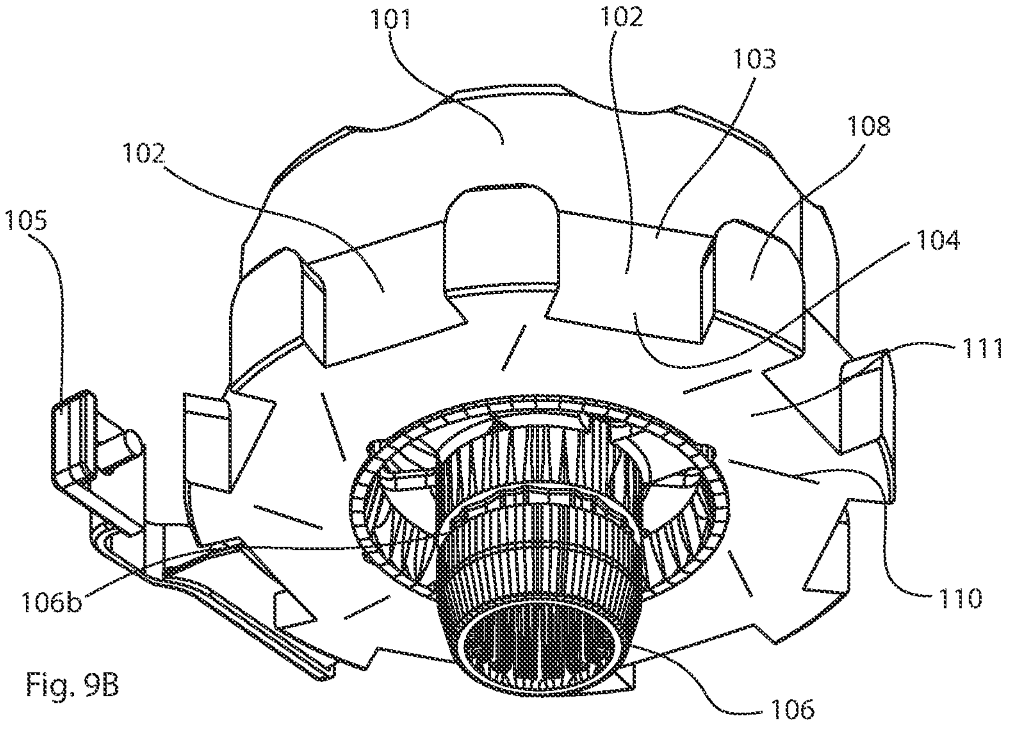

FIGS. 9A and 9B show detailed views of a separation device as well as components engaging operatively therewith. The separation device includes, amongst others, rotor 101 with a plurality of channels 102, which are separated from each other by webs 108. At the bottom 111 of rotors 101 a plurality of cleaning agents 110 are arranged, which contribute to moving the contamination particles lying on the bottom surface 4 between circular contact area 10 and recess 7 to the recess, whereby the alignment of cleaning agents 110 depends on the rotational direction of the rotor.

FIG. 9A further shows stop mechanism 107, which engages operatively with rotor axis 106. In doing so, stop mechanism 107 includes, among others, an at least sectionally clastic arm 107*c*, which can engage with recesses of a toothing 106*b* formed in rotor axis 106 (see FIG. 9B). Such stop mechanism serves to determine the rotor for specific operating conditions so that a non-intended rotation of the rotor can be avoided. In doing so, unintended dispensing of a medicament portion can be prevented. For example, the stop mechanism can arrest the rotor if the storage container is removed from the container intake. In doing so, it can be provided, for example, that during fitting of the storage container onto the container intake, the stop mechanism 107 is made to disengage with toothing 106*b* via the at least sectionally elastic arm 107*c*, but made to reengage with the toothing during removing of the storage container and thus arresting the rotor.

Figure 10:
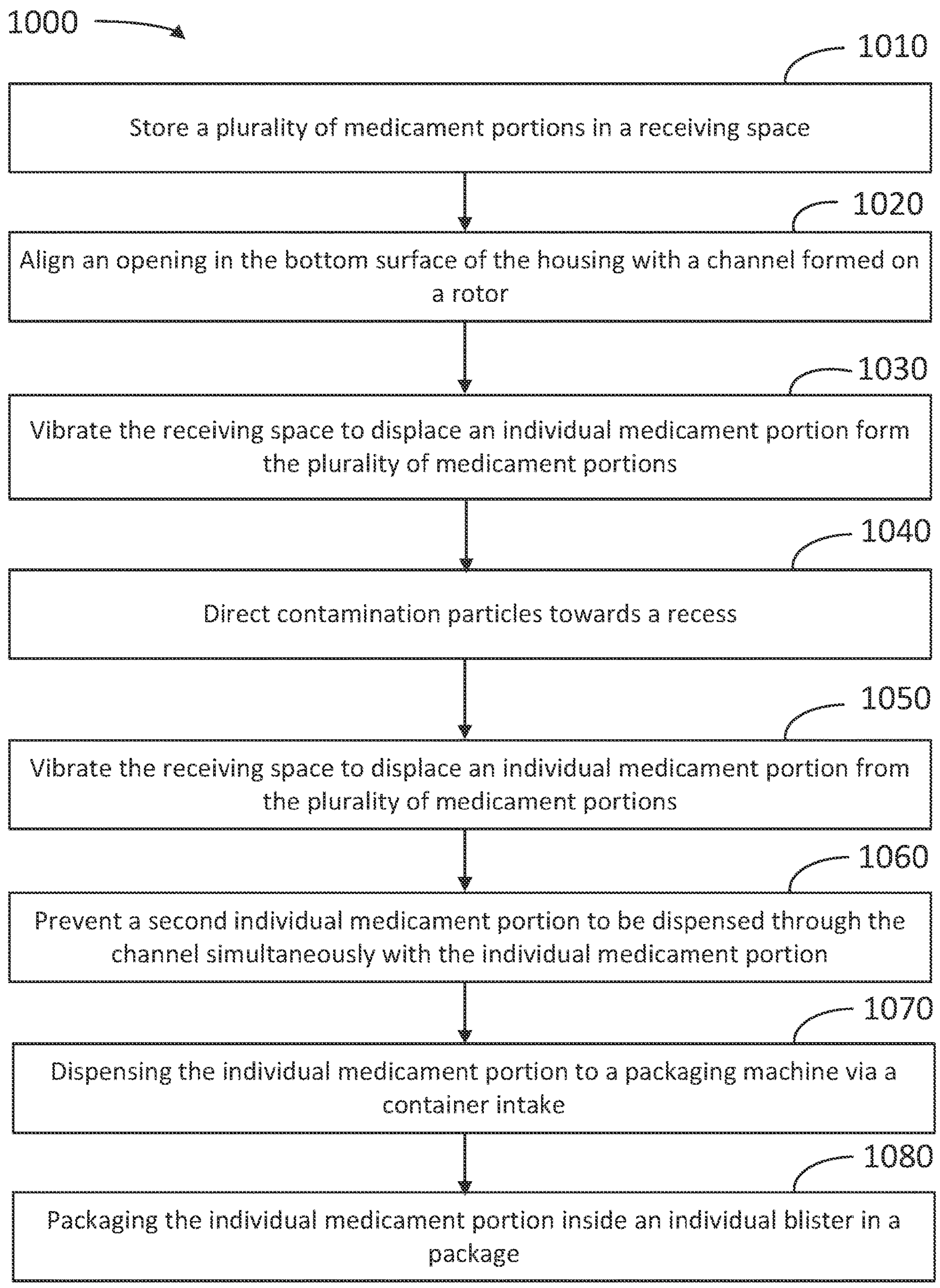
FIG. 10 depicts a flow chart illustrating steps in a method for dispensing individual medicament portions, according to some embodiments.

FIG. 10 shows a flow chart illustrating steps in a method 1000 for dispensing individual medicament portions, according to some embodiments. Method 1000 may be performed in connection with an apparatus for dispensing individual medicament portions consistent with the present disclosure. Accordingly, the apparatus in method 1000 may include a housing having a dispensing opening (e.g., dispensing opening 109, cf. FIG. 3), a storage container configured to store a plurality of medicament portions (cf. FIGS. 1-7), a vibration device configured to vibrate the storage container (e.g., vibration device 12, cf. FIG. 4), and a rotor having a plurality of channels (e.g., rotor 101 and channels 102, cf. FIG. 2). Accordingly, each of the channels is configured to dispense an individual medicament portion when the rotor turns by a selected angle. The storage container may further include a bottom surface having a recess configured to collect contamination particles (e.g., bottom surface 4, cf. FIG. 3), the bottom surface having a funnel shape to direct the contamination particles to the recess by gravity. Also, the storage container may include a retention component configured to engage with the aligned channel to prevent a second individual medicament portion to be dispensed together with the first individual medicament portion (e.g., retention component 105, cf. FIG. 2).

Steps in method 1000 may be performed at least partially by an operator, medical personnel, or a healthcare professional in a healthcare facility or in a drugstore, or in a pharma manufacturing facility. Accordingly, method 1000 may be part of a medicament management or a drug logistic prepared by a physician or a healthcare professional. Moreover, method 1000 may be performed automatically upon execution of a command provided by or controlled by a healthcare professional. For example, steps in method 1000 may be programmed or directed with commands on computer-readable media, which, in some embodiments, can comprise non-transitory computer readable media.

Methods consistent with the present disclosure may include at least one of the steps illustrated in FIG. 10, performed in any order. In some embodiments, a method may include at least two for the steps illustrated in FIG. 10 performed overlapping in time, or even simultaneously. Moreover, embodiments consistent with the present disclosure may include at least one but not all of the steps illustrated in FIG. 10. Furthermore, methods consistent with the present disclosure may include more steps, in addition to at least one of the steps illustrated in FIG. 10. In some embodiments, one or more steps may be repeated.

Step 1010 includes storing medicament portions in a receiving space formed between the housing section and the rotor at the center of a bottom surface of the housing section. Step 1020 includes aligning an opening in the bottom surface of the housing with the channel formed on the rotor. In some embodiments, step 1020 includes rotating the rotor by a selected angle. Step 1030 includes vibrating the receiving space to displace an individual medicament portion from the plurality of medicament portions. In some embodiments, step 1030 includes vibrating the receiving space when a packaging device coupled to the storage container fails to blister, to avoid dispensing of a medicament portion to a defective package. Step 1040 includes directing contamination particles towards the recess. Step 1050 includes vibrating the receiving space, and allowing the contamination particles to collect into the recess by gravity. And Step 1060 includes preventing a second medicament portion to be dispensed through the channel simultaneously with the individual medicament portion, unless so desired according to the medicament management or the drug logistic. Accordingly, step 1060 may include partially engaging and blocking the channel formed in the rotor with the retention component. Step 1070 includes dispensing the individual medicament portion to a packaging machine via a container intake. And step 1080 includes packaging the individual medicament portion inside an individual blister in a package with the packaging device.

It is understood that any specific order or hierarchy of blocks in the processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed:

1. A storage and dispensing device, comprising:
- a housing;
- a rotor disposed in the housing;
- a dispensing opening disposed in a bottom surface of the housing and configured to receive an individual medicament portion when a first channel of the rotor is aligned with the dispensing opening; and
- a recess disposed in the bottom surface of the housing and at least partially surrounding an axis of the rotor,
- wherein the bottom surface comprises a protrusion at least partially surrounding the axis of the rotor, the protrusion configured to prevent contamination particles from reaching the axis of the rotor.

2. The storage and dispensing device of claim 1, wherein a plurality of webs on the rotor define a plurality of channels including the first channel, the plurality of webs overlapping a contact area on the bottom surface, the contact area being exposed to the medicament portions through the channels, and wherein the dispensing opening intersects the contact area to deliver the individual medicament portion as the medicament portions are swept by the webs upon a rotation of the rotor.

3. The storage and dispensing device of claim 1, further comprising a retention component configured to engage with a channel aligned with the dispensing opening and to prevent a second individual medicament portion from being dispensed through the channel aligned with the dispensing opening.

4. The storage and dispensing device of claim 1, wherein each of a plurality of channels of the rotor, including the first channel, comprises a first opening facing a receiving space of the housing and a second opening facing the bottom surface, and wherein the second opening is associated with a contact area on the bottom surface, over which contact area the medicament portions are guided upon a movement of the rotor.

5. The storage and dispensing device of claim 1, wherein the rotor is arranged to provide a gap between a bottom of the rotor and the bottom surface, through which gap contamination particles can pass.

6. The storage and dispensing device of claim 1, wherein at least a portion of the bottom surface is coated with a non-stick coating.

7. A storage and dispensing device, comprising:
- a housing;
- a rotor disposed in the housing;
- a dispensing opening disposed in a bottom surface of the housing and configured to receive an individual medicament portion when a first channel of the rotor is aligned with the dispensing opening;
- a recess disposed in the bottom surface of the housing;
- at least one cleaning agent disposed on the rotor and configured to move contamination particles to the recess when the rotor turns; and
- a gap between a bottom of the rotor and the bottom surface,
- wherein the bottom surface comprises a protrusion at least partially surrounding an axis of the rotor, the protrusion configured to prevent contamination particles from reaching the axis of the rotor.

8. The storage and dispensing device of claim 7, wherein a plurality of webs on the rotor define a plurality of channels including the first channel, the plurality of webs overlapping a contact area on the bottom surface, the contact area being exposed to the medicament portions through the channels, and wherein the dispensing opening intersects the contact area to deliver the individual medicament portion as the medicament portions are swept by the webs upon a rotation of the rotor.

9. The storage and dispensing device of claim 7, wherein each of a plurality of channels of the rotor, including the first channel, comprises a first opening facing a receiving space of the housing and a second opening facing the bottom surface, and wherein the second opening is associated with a contact area on the bottom surface, over which contact area the medicament portions are guided upon a movement of the rotor.

10. The storage and dispensing device of claim 7, wherein the rotor is arranged to provide a gap between a bottom of the rotor and the bottom surface, through which gap contamination particles can pass.

11. The storage and dispensing device of claim 7, wherein at least a portion of the bottom surface is coated with a non-stick coating.

12. A storage and dispensing device, comprising:

a housing;

a rotor disposed in the housing;

a dispensing opening disposed in a bottom surface of the housing and configured to receive an individual medicament portion when a first channel of the rotor is aligned with the dispensing opening;

a recess disposed in the bottom surface of the housing; and one of:

a stop element comprising an elastic arm configured to engage with a toothed profile formed in an axis of the rotor and to avoid an unintended rotation of the rotor; and a vibration device mechanically coupled to a contact area adjacent to the bottom surface, the vibration device configured to expose the housing to a vibration.

13. The storage and dispensing device of claim 12, wherein a plurality of webs on the rotor define a plurality of channels including the first channel, the plurality of webs overlapping a contact area on the bottom surface, the contact area being exposed to the medicament portions through the channels, and wherein the dispensing opening intersects the contact area to deliver the individual medicament portion as the medicament portions are swept by the webs upon a rotation of the rotor.

14. The storage and dispensing device of claim 12, wherein each of a plurality of channels of the rotor, including the first channel, comprises a first opening facing a receiving space of the housing and a second opening facing the bottom surface, and wherein the second opening is associated with a contact area on the bottom surface, over which contact area the medicament portions are guided upon a movement of the rotor.

15. The storage and dispensing device of claim 12, wherein the rotor is arranged to provide a gap between a bottom of the rotor and the bottom surface, through which gap contamination particles can pass.

16. The storage and dispensing device of claim 12, wherein the bottom surface comprises a protrusion at least partially surrounding the axis of the rotor, the protrusion configured to prevent contamination particles from reaching the axis of the rotor.

17. The storage and dispensing device of claim 12, wherein at least a portion of the bottom surface is coated with a non-stick coating.

18. The storage and dispensing device of claim 12, further comprising a retention component configured to engage with a channel aligned with the dispensing opening.

* * * * *